United States Patent [19]

Monteyne

[11] Patent Number: 4,477,349
[45] Date of Patent: Oct. 16, 1984

[54] METALURIGICAL SLAG FILTERING APPARATUS

[76] Inventor: Guido Monteyne, Beikenlaan 28, 9971 Lembeke, Belgium

[21] Appl. No.: 578,817

[22] Filed: Feb. 10, 1984

[30] Foreign Application Priority Data

Feb. 10, 1983 [LU] Luxembourg .................. 84642

[51] Int. Cl.³ .............................................. B01D 33/06
[52] U.S. Cl. .................... 210/297; 210/394; 210/403; 65/19; 65/141; 209/155
[58] Field of Search .................. 65/19, 20, 141; 210/297, 217, 307, 372, 373, 394, 402, 403, 404; 198/509, 525, 560, 612, 713, 714, 836; 209/155, 452, 482

[56] References Cited

U.S. PATENT DOCUMENTS

| | | | |
|---|---|---|---|
| 721,890 | 3/1903 | Henius | 210/403 |
| 1,712,258 | 5/1929 | Compain | 210/394 |
| 2,278,730 | 4/1942 | Neuman | 198/525 |
| 2,664,204 | 12/1953 | Hurter | 210/403 |
| 2,765,915 | 10/1956 | Nilsson | 210/403 |
| 3,014,589 | 12/1961 | Frykhult | 210/404 |
| 3,171,534 | 3/1965 | Oury | 198/525 |
| 3,399,466 | 9/1968 | Hartley | 198/525 |
| 3,612,246 | 10/1971 | Elze | 198/509 |
| 4,062,776 | 12/1977 | Blok | 210/403 |
| 4,204,855 | 5/1980 | Monteyne | 210/394 |
| 4,236,628 | 12/1980 | Stahaura | 198/525 |
| 4,392,949 | 7/1983 | Kruyer | 210/403 |

FOREIGN PATENT DOCUMENTS 280260 8/1913 Fed. Rep. of Germany ...... 210/403

Primary Examiner—Ernest G. Therkorn
Attorney, Agent, or Firm—Fishman & Dionne

[57] ABSTRACT

A filtration apparatus comprised of a rotary drum having a plurality of internal vanes for conveying slag material therein therein is presented. The slag is conveyed upwardly by the vanes, after which it falls freely onto a conveyer belt passing longitudinally through the drum. Each vane consists of a retaining blade and a liquid permeable filtering blade spaced from the retaining blade. A deflecting means is positioned beneath the filtering blade. The deflecting means includes a deflecting plate associated with a support member. The support member and the retaining blade provide a supporting frame work for the rotary drum.

14 Claims, 3 Drawing Figures

METALURIGICAL SLAG FILTERING APPARATUS

BACKGROUND OF THE INVENTION

This invention relates to an apparatus for filtering metallurgical slag. More particularly, this invention relates to a new and improved filtering drum used in conjunction with a metallurgical slag filtering apparatus. The general type of filtering apparatus to which this invention is directed is disclosed in my earlier U.S. Pat. No. 4,204,855, of which all of the disclosure is incorporated herein by reference. This application presents an improved drum construction for the filtering apparatus of U.S. Pat. No. 4,204,855. Other improved features are disclosed in my co-pending U.S. Applications Ser. Nos. 578,816 and 578,818 being filed simultaneously herewith, all of the contents of which are incorporated herein by reference thereto.

The filtration apparatus of U.S. Pat. No. 4,204,855 generally comprises a substantially horizontal rotary drum having filtering screens or foraminous walls along the outside surface thereof and being provided with internal vanes along the inside surface thereof for conveying metallurgical granulated slag material upwardly. Thereafter, the filtered slag falls freely onto a conveyer belt passing longitudinally through the drum. A filtering apparatus of this type will also include a feed channel through which the pulp, i.e., granulated slag and water, is fed into the drum.

The present invention presents an improved drum structure which reduces or prevents the filtering water of one internal vane from falling onto the filtered slag of an adjacent vane on the "downstream" side (i.e. downstream in the direction of the flow of filtered water); which improves damage to the filtration screen around the rotary drum from loose slag; which improves the efficiency of filling and draining of the vanes: and, which improves structural support of the filtering drum by the internal vanes.

SUMMARY OF THE INVENTION

In accordance with the present invention, a novel and improved internal vane structure is incorporated into a rotary drum for a metallurgical slag filtration apparatus.

The apparatus in accordance with the present invention comprises a substantially horizontal rotary drum having a generally cylindrical outer foraminous or screen-type filtering wall between end walls. The rotary drum is provided with a plurality of vanes along the internal inner side of the cylindrical walls, the vanes being suitable for conveying granulated slag material upwardly. Thereafter, the filtered slag is discharged by falling freely onto a conveyer belt passing longitudinally through the drum.

The novel internal vane structure of the present invention consists of a plurality of retaining blades and spaced filtering blades. A novel deflecting means is provided behind or beneath each filtering blade, as viewed in the direction of rotation. The deflecting means comprises a deflecting plate and an associated support structure. The support structure and the retaining blade are connected to the end walls form a supporting framework for the rotary drum. Deflector plates positioned relative to the openings between the retaining and filtering blades to protect the screen outer wall.

The support structure portion of the deflecting means is preferably L-shaped, the deflector plate being welded at the ends thereof so as to form a closed triangular configuration.

The filtration apparatus of the present invention provides many features and improvements over the prior art. For example, the novel deflecting means acts to deflect filtered water of one draining vane away from and out of contact with filtered slag located on the next downstream vane. Moreover, the deflecting means and the blade structure provide strong structural support for the drum. Still another feature of the present invention is the improved efficiency during filling and draining operations of the vane.

The above-discussed and other advantages of the present invention will be apparent to and understood by those skilled in the art from the following detailed description and drawings.

BRIEF DESCRIPTION OF THE DRAWINGS

Referring now to the drawings, wherein like elements are numbered alike in the several figures.

DESCRIPTION OF THE PREFERRED EMBODIMENT

Figure 1:
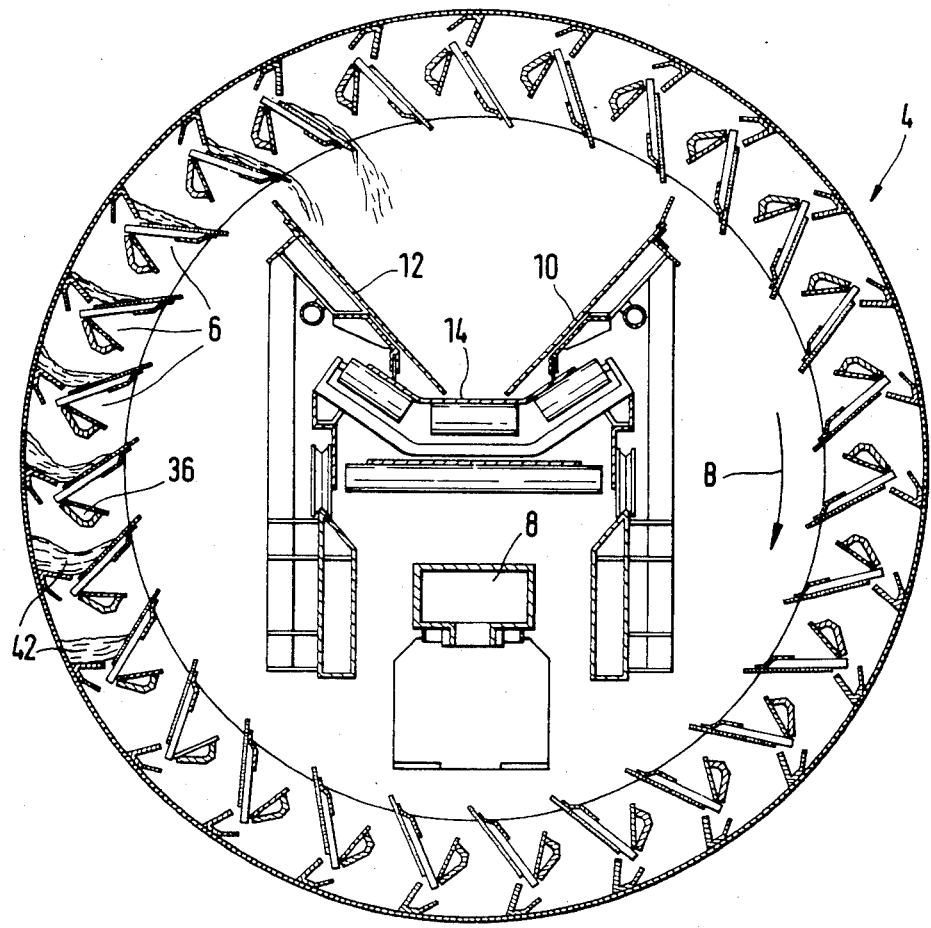
FIG. 1 is a cross sectional elevation view of a filtration apparatus in accordance with the present invention.

Referring first to FIG. 1, the filtration apparatus shown therein is of the general type described in the previously mentioned U.S. Pat. No. 4,204,855 and therefore, similar or identical structural details will not be described herein. Accordingly, reference should be made to the U.S. Patent for this type of information.

In FIG. 1, a rotary drum is shown generally at 4. The outer surface of drum 4 consists of a wire filtration screen or other foraminous wall having a plurality of filtering vanes 6 on the interior therof. Filtering vanes 6 are comprised, in part, of a foraminous material so as to allow water to flow therethrough. The drum 4 rotates in the direction indicated by the arrow B so that the pulp, i.e., water having granulated slag therein and having been supplied to the drum through a pipe 8 inside the drum 4, is conveyed upwardly by the vanes 6. The water/granulated slag pulp mixture will pass through the filtering surfaces of the drum 4 and of the vanes 6. As a result, the granulated slag will be separated from the water solution as the slag is conveyed upwardly by the vanes 6. As the freed slag approaches the upper portion of the drum 4, the slag will be discharged by the vanes 6 and deflected by the longitudinal deflectors 10 and 12 onto a conveyor belt 14 thereby permitting the granulated slag to be continuously removed from the drum 4.

Figure 3:
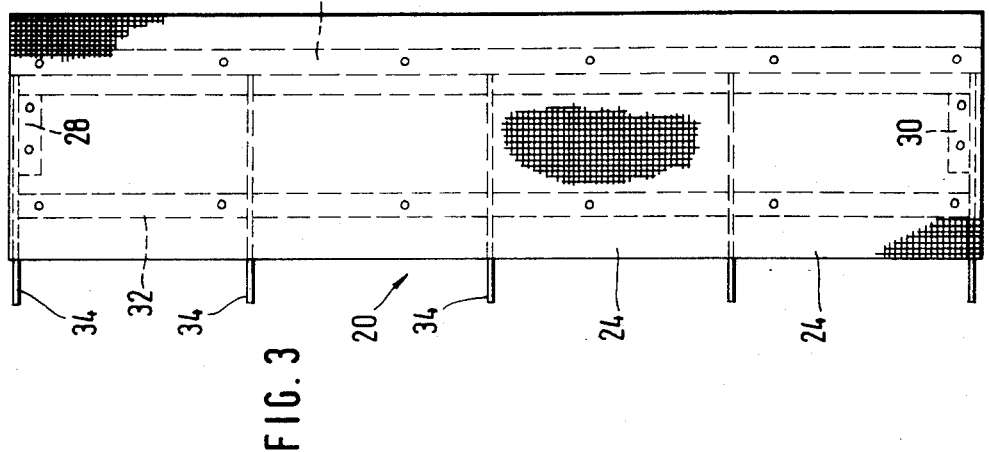
FIG. 3 is a plan view of a filtering blade, looking from the direction indicated by line III—III of FIG. 2.
Figure 2:
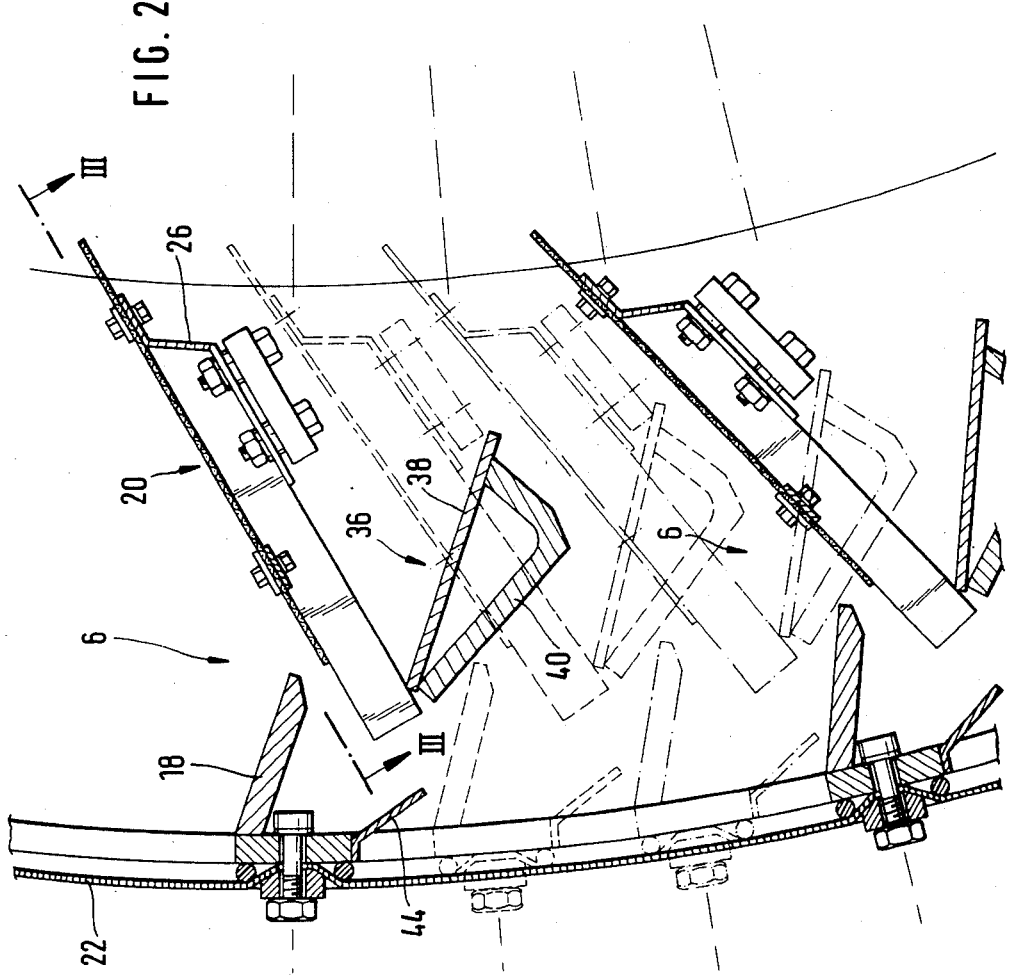
FIG. 2 is an enlarged view, partly in cross-section, of two vane portions from FIG. 1.

FIG. 2 is an enlarged view of the vanes 6 of FIG. 1. In FIG. 2, each vanes 6 is comprised of a retaining blade 18 and filtering blade 20. Retaining blade 18 is formed of a relatively thick plate which is welded to the two end walls (not shown, item 23 in U.S. Pat. No. 4,204,855) of the rotating drum 4 or to intermediate lateral walls of the drum. Retaining blades 18 therefore, forms a supporting framework for the filtering lattice 22. As mentioned, filtering lattice 22 consists of a wire filtration screen or foraminous wall which is positioned on and defines the outer surface of drum 4. Filtering blade 20, as shown in FIG. 3, consists of a number of juxtaposed plates 24. These plates 24 are actually individual filtering screens having mesh sizes which enable the water to pass through without difficulty while leaving the granulated slag material behind on the upper surface of the plates. In each blade 20, the plurality of plates 24 are bolted to a bar 26. The bar 26, in turn, is bolted to supports 28 and 30 of end or lateral or intermediate walls of the drum 4. The plates 24 are also bolted to a similar bar 32 which is supported by cross pieces 34. Cross pieces 34 are intregral with the first supporting bar 26.

The drum may be axially subdivided into sections by intermediate lateral walls, with the vanes in each section being angularly offset relative to the vanes in adjoining sections. Such angularly offset blade structure is shown in FIG. 1.

Referring jointly to FIGS. 1 and 2, each vane 6 has a deflector means 36 positioned thereunder relative to the rotation of the drum 4. Each deflector 36 consists of a solid (i.e. nonforaminous) deflecting plate 38 and an associated solid support structure 40. While support structure 40 may have a variety of configurations, in a preferred embodiment, support member 40 is L-shaped such that the two ends thereof will support the deflecting plate 38 thereby forming a closed triangular configuration. It should be understood that the interior of this closed triangle will not be exposed to the pulp or to any associated water or steam.

Deflector support member 40 acts as a framework for the support of the drum 4 and the blades 20 via the cross pieces 34 (which are supported at the outermost end of plates 38). Like the retaining blades 18, the deflecting support member 40 should be comprised of a relatively thick plate secured to the end walls of the drum 4 or to lateral or intermediate walls of the drum 4.

The function of the deflectors 36, and particularly of the deflector plates 38 are clearly shown with reference to FIG. 1. Referring to the lower portion of the drum 4 in FIG. 1, when the vanes 6 begin to ascend or travel upwardly as the drum rotates in the direction of arrow B, the pulp, and particularly the granulated slag, will settle to the bottom of the vanes against the lattice 22. As a result, a bank of granulated slag 42 will form and be supported by the solid retaining blade 18. Thereafter, the granulated slag will be delivered upwardly simultaneously flowing along and towards the inner end of filtering blades 20. During this time period, the filtering water will flow and separate from the slag material. Initially, the water will flow in the space between the two blades 18 and 20. As the drum continues to rotate, the water will begin to flow through the filtering plates 20. As shown in FIG. 1, each deflector means 36 will act to deflect the filtered water which has just passed through the mesh of the immediately downstream filtering blades 20. This deflection by the deflecting means 36 will prevent the filtered water from falling back onto the bank of granulated slag 42 on the immediately downstream blade, the slag being now positioned between the blades 18 and the blades 20. Thus, as more and more of the water is removed from the piles or banks of granulated slag, the water will be prevented from flowing back onto the downstream slag piles 42 located on an adjacent upstream vane.

It will be understood that the angle of inclination of the deflector means 36 is such that during the rotation of the drum 4, as the banks of slag 42 are spread inwardly onto the blades 20, the filtered water will be increasingly deflected towards the interior of the drum 4 by the plates 38. The particular angle of inclination of the filtering blades 20 relative to the blades 18 and the drum 4 is selected so as to insure that the granulated slag material will be well distributed in the vanes 6 and will be properly discharged. In this way the slag will be discharged at the desired place when it reaches the upper portion of the drum. Moreover, a further purpose for this angle of inclination is to prevent the contents from one vane 6 from falling therefrom in a latch and to insure that the slag falls progressively or in small quantities over time, therefore, effecting uniform loading of the conveyor belt 14.

The opening between the retaining blades 18 and filtering blades 20 is very important in establishing satisfactory and efficient operation of the rotating drum 4. Clearly, in order to retain a substantial portion of the granulated slag in the vane during rotation, the opening between the blades 18 and 20 must not be excessively large. However, an opening of at least some size is required in order to permit desired passage of the water for effective filtration. The opening must also be sufficiently large so that the vanes 6 may be easily filled while rotating through the lower portion of the drum 4. However, vanes 6 of too great a size may adversely and excessively stir the pulp. During the vane filling operations, which takes place in the lower portion of the drum 4, the overall filling efficiency partly is accomplished by pulp passing through the opening provided in a preceding vane. If this opening is not present, the pulp would be stirred too vigorously thereby causing the pulp to overflow the sides of the drum 4 while also and undesirably impeding the separation which has already begun at this stage between the slag and the water.

The pulp also developes a certain velocity while passing through the openings between the retaining blades 18 and filtering blades 20 during filtering. To prevent the granulated slag particles of the pulp from being flung at high speed onto the filtering surface or lattice 22 of the drum 4 (whereby the mesh is apt to be damaged), a further feature of the present invention consists of a plate 44 which is provided between each vane 6 and wall 22. Plate 44 is positioned so as to deflect the impact of the pulp passing through the opening between the blades 18 and 20. Thus, the plate serves to deflect the pulp (i.e., granulated slag and water) onto the next vane 6 positioned downstream thereby effectively protecting and furthering the life cycle of the mesh 22.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A filtration apparatus including a rotary drum, said rotary drum having a foraminous wall along the outside surface thereof and end walls, said rotary drum having a plurality of internal vanes for filtering liquid and solid materials, said filtered solid material being conveyed upwardly and subsequently falling onto a conveyer belt passing longitudinally through the drum, each of said vanes comprising:

retaining blade means extending from said drum;
filtering blade means disposed across from said retaining blade means and separated by an opening therebetween, said filtering blade means permitting liquid to pass therethrough; and deflecting means positioned beneath said filtering blade means to prevents said separated filtered water from falling onto the filtered solid material of an adjacent vane.

2. The apparatus of claim 1 wherein:

said rotary drum includes two sidewalls and wherein:

said retaining blade means is attached between said two sidewalls of said rotary drum.

3. The apparatus of claim 2 wherein said filtering blade means includes:

a plurality of juxtaposed plates, said plates being comprised of foraminous material, said plates having a first side and a second side.

4. The apparatus of claim 3 wherein:

said foraminous material is liquid permeable mesh.

5. The apparatus of claim 3 including:

first support means being attached to said first side of said plates; and second support means being attached to said second side of said plates.

6. The apparatus of claim 5 including:

means for attaching said plates to said side walls of said rotating drum.

7. The apparatus of claim 3 including:

means for attaching said plates to said side walls of said rotating drum.

8. The apparatus of claim 7 wherein each of said deflecting means includes:

deflecting plate means; and a support member attached to a first side of said deflecting plate means.

9. The apparatus of claim 8 wherein:

said support member is connected to said attaching means.

10. The apparatus of claim 1 wherein:

said retaining blade means acts as a supporting framework for said filtering walls of said drum.

11. The apparatus of claim 1 wherein each of said deflecting means includes:

deflecting plate means; and a support member attached to a first side of said deflecting plate means.

12. The apparatus of claim 11 wherein:

said support member is L-shaped having a first and second end, said first and second ends being attached to said deflecting plate thereby forming a triangular configuration.

13. The apparatus of claim 11 wherein:

said triangular configuration is closed thereby preventing exposure therein to filtered solid or liquid.

14. The apparatus of claim 1 including:

plate means attached to said interior surface of said drum whereby said solid filtered material is prevented from contacting said foraminous wall.

* * * * *